US009317294B2

(12) United States Patent
Muff et al.

(10) Patent No.: US 9,317,294 B2
(45) Date of Patent: Apr. 19, 2016

(54) CONCURRENT MULTIPLE INSTRUCTION ISSUE OF NON-PIPELINED INSTRUCTIONS USING NON-PIPELINED OPERATION RESOURCES IN ANOTHER PROCESSING CORE

(71) Applicant: International Business Machines Corporation, Armonk, NY (US)

(72) Inventors: Adam J. Muff, Issaquah, WA (US); Paul E. Schardt, Rochester, MN (US); Robert A. Shearer, Woodinville, WA (US); Matthew R. Tubbs, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 13/707,020

(22) Filed: Dec. 6, 2012

(65) Prior Publication Data

US 2014/0164734 A1 Jun. 12, 2014

(51) Int. Cl.
*G06F 9/38* (2006.01)
*G06F 9/50* (2006.01)

(52) U.S. Cl.
CPC ............ *G06F 9/3836* (2013.01); *G06F 9/3891* (2013.01); *G06F 9/505* (2013.01)

(58) Field of Classification Search
CPC ....... G06F 9/3001; G06F 9/38; G06F 9/3836; G06F 9/3877; G06F 9/3885; G06F 9/505; G06F 2009/3883
See application file for complete search history.

(56) References Cited

U.S. PATENT DOCUMENTS

| | | | | |
|---|---|---|---|---|
| 5,809,323 | A * | 9/1998 | Eisen et al. | 712/23 |
| 5,867,704 | A * | 2/1999 | Tanaka et al. | 718/105 |
| 6,718,457 | B2 | 4/2004 | Tremblay et al. | |
| 7,600,096 | B2 | 10/2009 | Parthasarathy et al. | |
| 8,516,223 | B2 * | 8/2013 | Fusejima et al. | 712/23 |
| 2002/0178350 | A1 * | 11/2002 | Chung | G06F 9/325 712/241 |
| 2006/0224864 | A1 | 10/2006 | DeMent et al. | |
| 2008/0040589 | A1 * | 2/2008 | Sakamoto et al. | 712/229 |
| 2012/0110303 | A1 * | 5/2012 | Dhanwada et al. | 712/29 |

OTHER PUBLICATIONS

Parallel computing, 2012; Source: http://en.wikipedia.org/w/index.php?oldid=524664528, pp. 3-17.
MIPS Technologies, Beyond the Hype: MIPS®—the Processor for MCUs, Document No. MD00795, Revision 01.01, Sep. 10, 2010, pp. 1-13 (excepting Fig. 5).

* cited by examiner

*Primary Examiner* — David J Huisman
(74) *Attorney, Agent, or Firm* — Middleton Reutlinger

(57) ABSTRACT

A method and circuit arrangement utilize inactive non-pipelined operation resources in one processing core of a multi-core processing unit to execute non-pipelined instructions on behalf of another processing core in the same processing unit. Adjacent processing cores in a processing unit may be coupled together such that, for example, when one processing core's non-pipelined execution sequencer is busy, that processing core may issue into another processing core's non-pipelined execution sequencer if that other processing core's non-pipelined execution sequencer is idle, thereby providing intermittent concurrent execution of multiple non-pipelined instructions within each individual processing core.

22 Claims, 7 Drawing Sheets

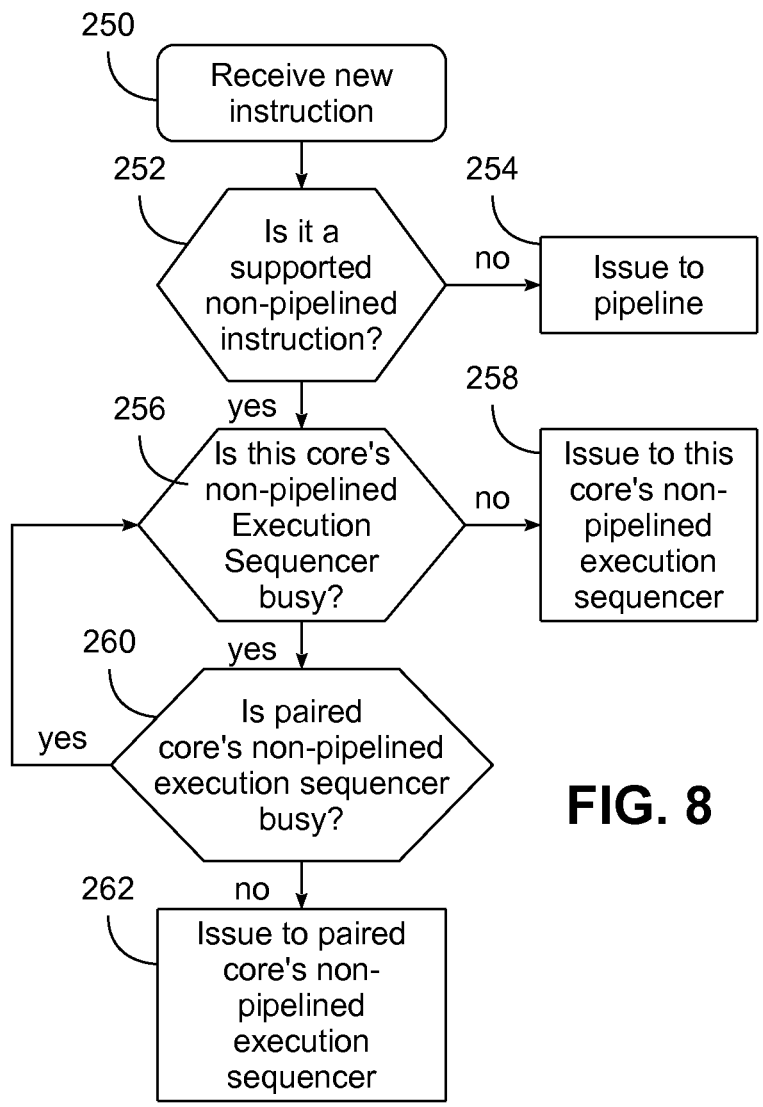

CONCURRENT MULTIPLE INSTRUCTION ISSUE OF NON-PIPELINED INSTRUCTIONS USING NON-PIPELINED OPERATION RESOURCES IN ANOTHER PROCESSING CORE

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

These various techniques for improving processing unit performance, however, do not come without a cost. Parallelism adds complexity, often requiring a greater number of logic gates, which increases both the size and the power consumption of such processing units. Coupling these techniques with the general desire to increase performance through other techniques, such as increased switching frequency, the power consumption of complex, high performance processing units continues to increase, despite efforts to reduce such power consumption through process improvements. Excessive power consumption can present issues for portable or battery powered devices, but more typically, excessive power consumption presents issues for nearly all electronic circuits due to the generation of heat, which often requires elaborate cooling systems to ensure that a circuit does not overheat and fail.

Due to these competing concerns, therefore, designers of microprocessors and other types of processing units often must balance the desire to incorporate sufficient logic circuitry to efficiently execute expected workloads with the need to minimize the amount of logic circuitry for power and cost concerns.

One area in which these competing concerns is often raised is that of non-pipelined instructions such as multiplies, divides, square roots, and other complicated math operations. Whereas most instructions in a processing unit are capable of being executed by pipelined execution logic, non-pipelined instructions typically must be executed serially, i.e., with only one instruction executed at a time rather than performing multiple stages of multiple instructions in parallel. It has been found that, in particular, the algorithms required to compute such complicated instructions are themselves complicated and typically must be broken down into iterative solutions. In addition, since a loop is often involved in the performance of such instructions, pipelining is often not feasible, as collisions would likely occur when the loop is attempted.

As a result, direct implementation of non-pipelined instructions in hardware often requires complex, dedicated execution logic involving relatively long latencies for completion. In fact, in many instances, the cost of implementing the instructions directly in hardware is too high from both a power and area point of view, resulting in many processor designs implementing non-pipelined instructions indirectly by running recursive loops through simpler and shorter sets of math operations that eventually produce the correct results. The recursive loops, however, require additional processor cycles to complete, thereby increasing the latency even beyond that of direct implementations.

Regardless of whether non-pipelined instructions are implemented directly or indirectly, additional delays often result for subsequent instructions in an instruction stream. Thus, if an execution unit is currently executing a non-pipelined instruction, newer non-pipelined instructions typically must wait for the older instruction to finish before they can be issued. In some architectures, some non-pipelined instructions may even block any new instruction, even pipelined instructions, from being issued. In either case, this can cause serious performance degradation for many applications.

One approach for addressing dependencies associated with non-pipelined instructions is to utilize multiple instances of non-pipelined execution logic within an execution unit of a processing unit to handle such instructions, such that if one instruction is being executed by one instance of the non-pipelined execution logic, subsequent instructions may be forwarded to other instances for execution. However, as noted above, the execution logic used to execute non-pipelined instructions is typically complex in nature, so incorporating multiple instances of such logic is usually not desirable, particularly where cost and power consumption are of concern.

Therefore, a significant need continues to exist in the art for a manner of quickly, efficiently and cost-effectively executing non-pipelined instructions in a processing unit.

SUMMARY OF THE INVENTION

The invention addresses these and other problems associated with the prior art by utilizing inactive non-pipelined operation resources in one processing core of a multi-core processing unit to execute non-pipelined instructions on behalf of another processing core in the same processing unit. For example, in some embodiments of the invention, adjacent processing cores in a processing unit may be coupled together such that one processing core may be permitted, when that processing core's non-pipelined execution logic is busy, to issue into another processing core's non-pipelined execution logic if that other processing core's non-pipelined execution logic is idle. By doing so, the performance benefits associated with concurrent execution of multiple non-pipelined instructions may be obtained, but without requiring the additional circuit area and/or power cost associated with including multiple instances of non-pipelined execution logic within each individual processing core.

Therefore, consistent with one aspect of the invention, a circuit arrangement includes a first processing core including first non-pipelined execution logic configured to execute at least one non-pipelined instruction, and a second processing core including second non-pipelined execution logic configured to execute the at least one non-pipelined instruction. The second processing core is configured to selectively issue a non-pipelined instruction to each of the first non-pipelined execution logic and the second non-pipelined execution logic.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 8 is a flowchart illustrating an example sequence of operations performed to issue instructions in each of the floating point execution units referenced in FIG. 5.

DETAILED DESCRIPTION

Embodiments consistent with the invention utilize inactive non-pipelined operation resources in one processing core of a multi-core processing unit to execute non-pipelined instructions on behalf of another processing core in the same processing unit. Adjacent or paired processing cores in a common processing unit may be coupled together such that one processing core may be permitted, when that processing core's non-pipelined execution logic is busy, to issue into another processing core's non-pipelined execution logic if that other processing core's non-pipelined execution logic is idle. By doing so, the performance benefits associated with concurrent execution of multiple non-pipelined instructions may be obtained, albeit intermittently, but without requiring the additional circuit area and/or power cost associated with including multiple instances of non-pipelined execution logic within each individual processing core.

Other variations and modifications will be apparent to one of ordinary skill in the art. Therefore, the invention is not limited to the specific implementations discussed herein.

Hardware and Software Environment

Figure 1:
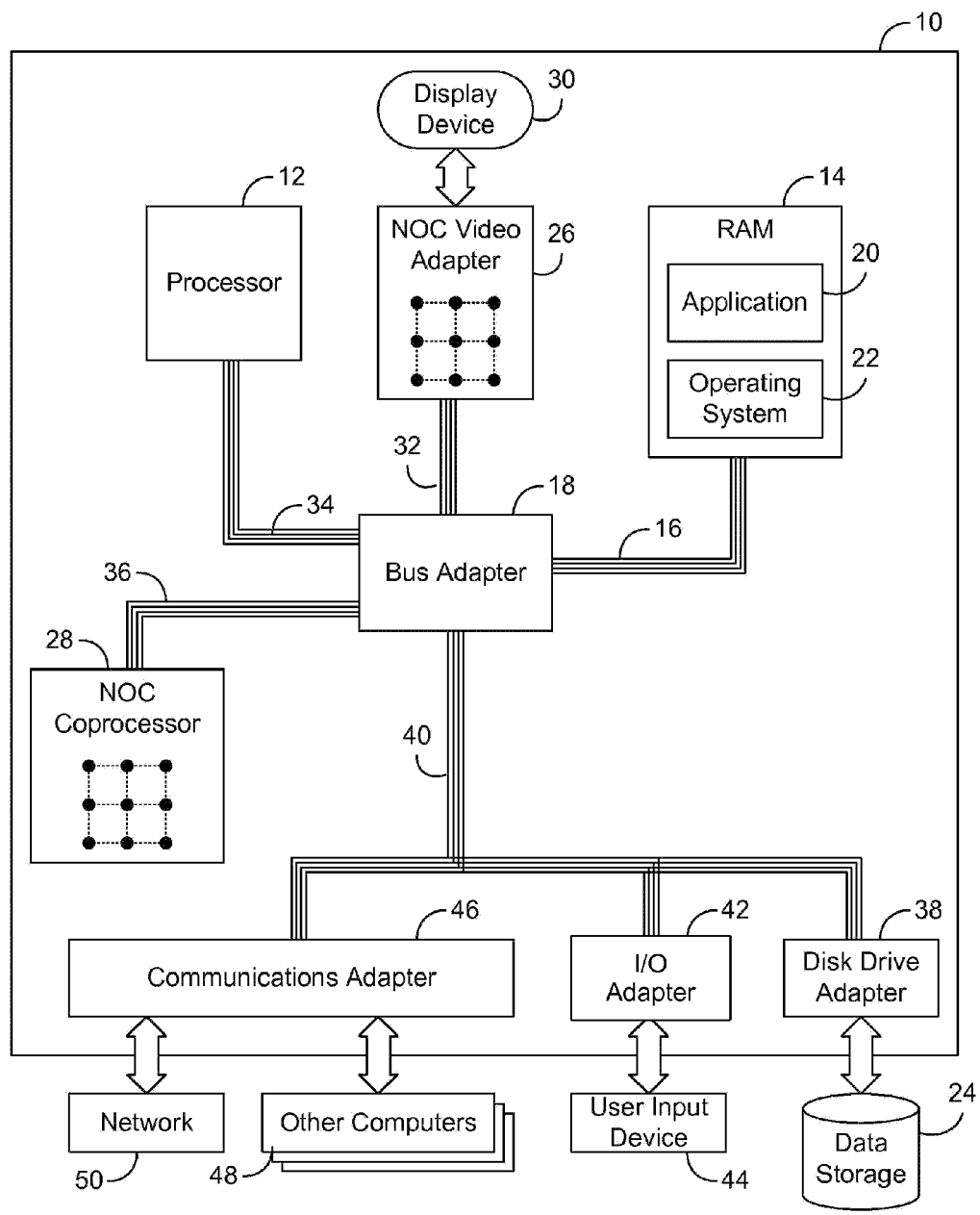
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
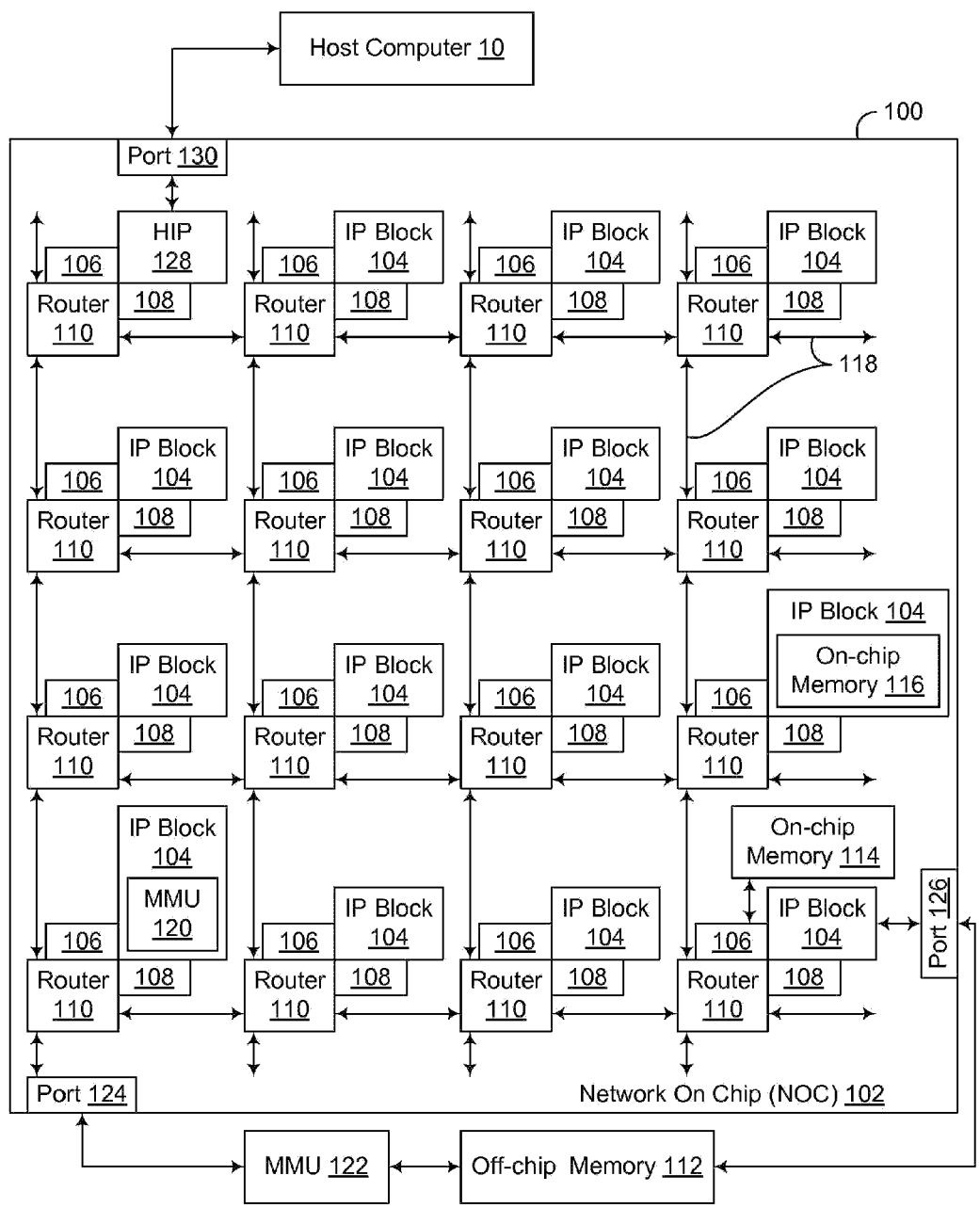
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
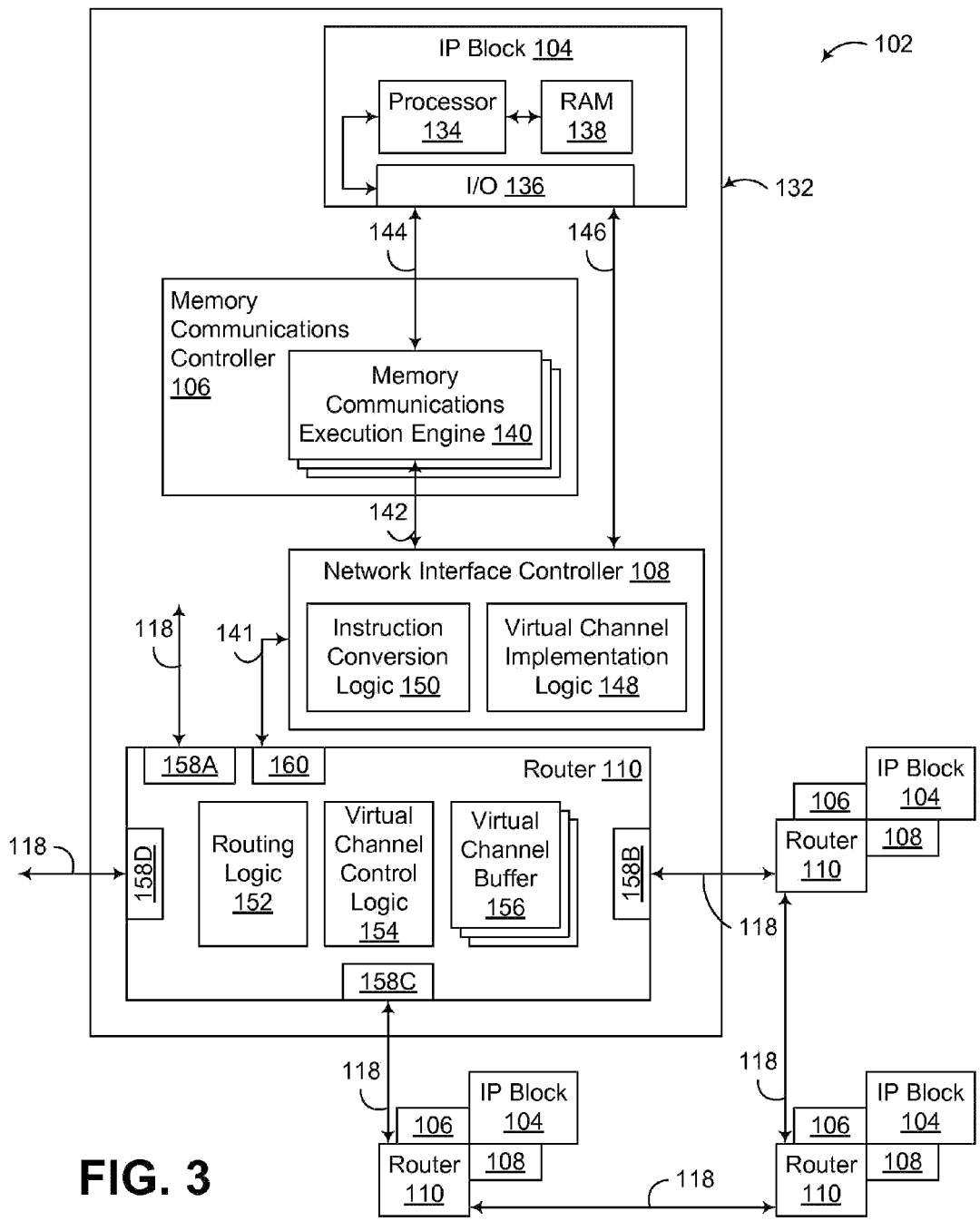
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
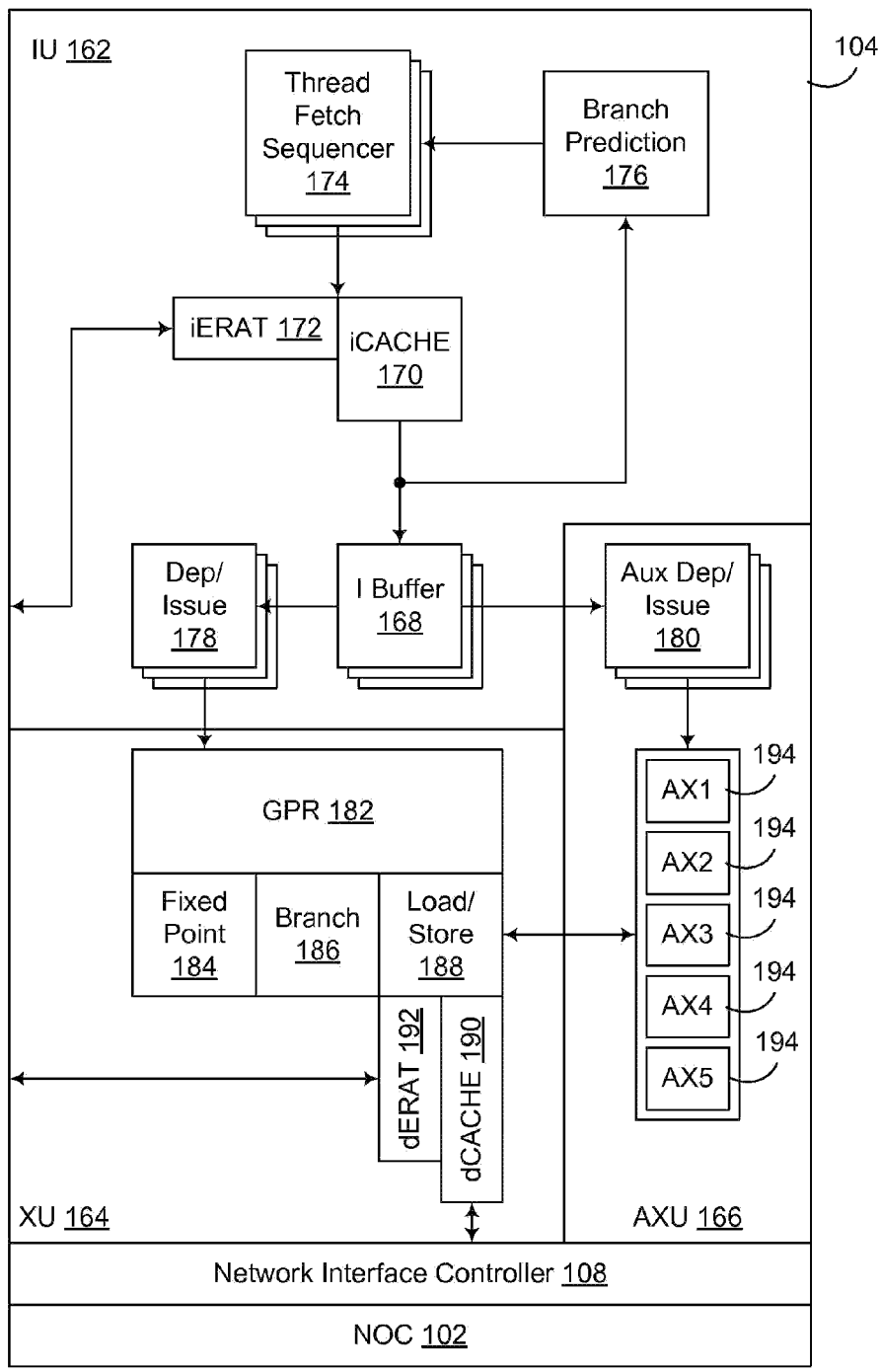
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32*b* or 64*b* PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Concurrent Multiple Instruction Issue of Non-Pipelined Instructions Using Non-Pipelined Operation Resources in Another Processing Core Non-pipelined microprocessor operations such as multiply, divide and square root instructions are operations that are typically execute serially, i.e., such that only one instruction can be executing at a time rather than performing multiple stages of multiple instructions in parallel. This means that if an execution unit is currently executing a non-pipelined instruction, newer non-pipelined instructions typically must wait for the older one to finish before they can be issued. In some architectures, some non-pipelined instructions may even block any new instruction, including pipelined instructions, from being issued. In either case, this can cause serious performance degradation for certain applications.

However, modern microprocessors have been reaching diminishing returns in achieving ever-greater single-core performance, and so modern microprocessor designers increasingly opt for including multiple identical processor cores on a chip as transistor sizes shrink.

As will become more apparent hereinafter, embodiments consistent with the invention may add a relatively small amount of control circuitry to targeted execution units to allow one processing core to issue into another core's non-pipelined execution sequencer if the other core's non-pipelined execution sequencer is idle but the former core's non-pipelined execution sequencer is busy. By doing so, the performance benefits of intermittent concurrent multi-instruction issuance of non-pipelined operations typically may be obtained without the circuit area cost of including multiple non-pipelined execution sequencers in an execution unit.

Figure 5:
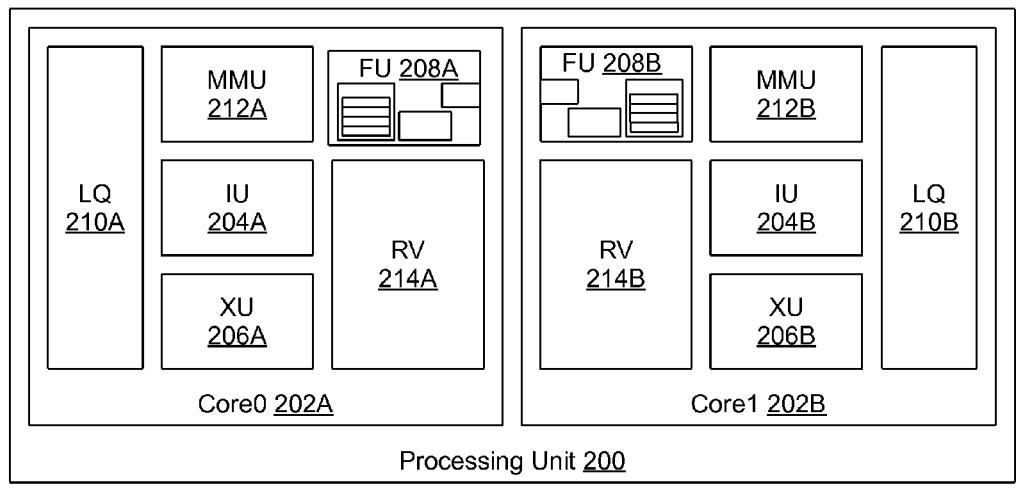
FIG. 5 is a block diagram illustrating an exemplary implementation of an IP block from the NOC of FIG. 2, and configured to implement concurrent multiple instruction issue of non-pipelined instructions consistent with the invention.

For example, as illustrated in FIG. 5, a processing unit 200 may include a pair of adjacent processing cores 202A, 202B, each including an instruction unit (IU) 204A, 204B, fixed point execution unit (XU) 206A, 206B, floating point execution unit (FU) 208A, 208B, and load/store unit (LQ) 210A, 210B. Each core 202A, 202B may also include additional logic, e.g., a memory management unit (MMU) 212A, 212B and reservation logic (RV) 214A, 214B. Consistent with the invention, floating point execution units 208A, 208B support concurrent multiple instruction issue of non-pipelined instructions, although it will be appreciated that such functionality may be implemented in other types of execution units consistent with the invention.

It will be appreciated that other logic components may be included in each core, including other types and/or numbers of execution units. In addition, more than two cores may be disposed in a processing unit consistent with the invention. Furthermore, while cores 202A, 202B in FIG. 5 are functionally identical, cores 202A, 202B may be heterogeneous cores in other embodiments.

To implement concurrent multiple instruction issue of non-pipelined instructions, cores 202A, 202B are paired together and disposed adjacent to one another in processing unit 200. Typically, but not necessarily, cores 202A, 202B are disposed in close proximity to one another, and in particular, arranged to orient their respective floating point execution units 208A, 208B in close proximity to one another, thereby desirably minimizing path lengths and latencies for inter-core communications.

Figure 6:
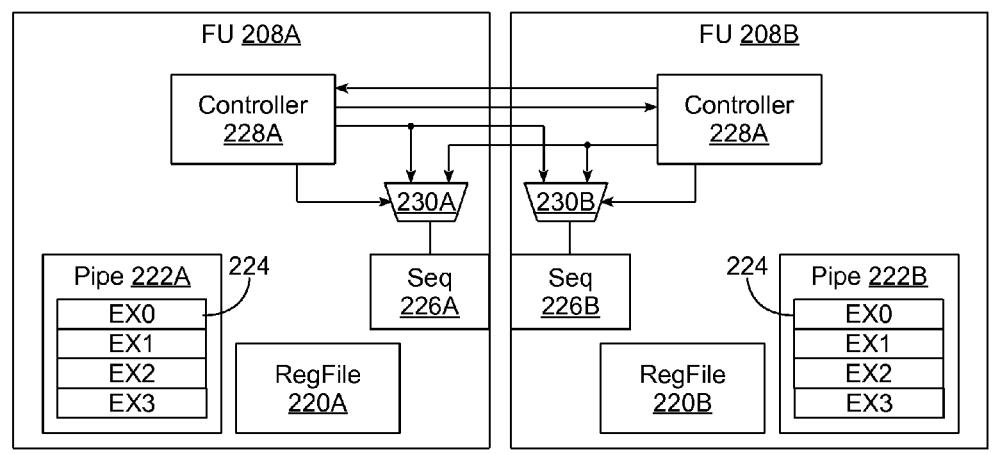
FIG. 6 is a block diagram of the floating point execution units referenced in FIG. 5.

As shown in FIG. 6, each floating point execution unit 208A, 208B may include a register file 220A, 220B and an execution pipeline 222A, 222B (each including a plurality of stages 224) used to execute pipeline instructions. In addition, each floating point execution unit 208A, 208B includes a non-pipelined instruction execution sequencer 226A, 226B configured to execute one or more non-pipelined instructions, e.g., multiply, divide, square root and other complex mathematical operations.

To provide concurrent multiple instruction issue, each floating point execution unit 208A, 208B includes control logic, e.g., a controller 228A, 228B that controls multiplexing logic 230A, 230B. Multiplexing logic 230A, 230B controls the issuance of non-pipelined instructions to the respective sequencer 226A, 226B from either the local controller 228A, 228B in the same core as the floating point execution unit 208A, 208B, or the remote controller 228A, 228B in the adjacent, paired core. As such, either controller 228A, 228B is configured to issue non-pipelined instructions to either of the sequencers 226A, 226B.

Figure 7:
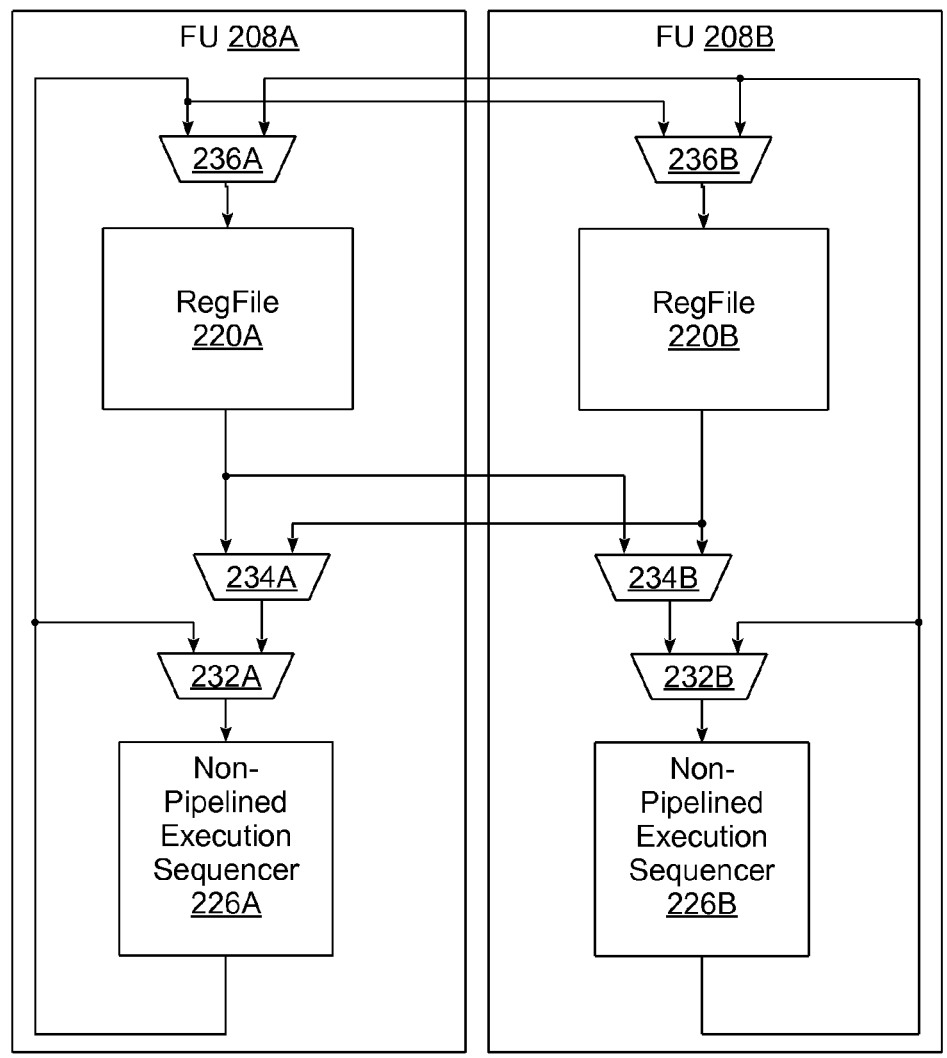
FIG. 7 is a block diagram of the register files and non-pipelined execution sequencers of the floating point execution units referenced in FIG. 5.

In addition, as illustrated in FIG. 7, floating point execution units 208A, 208B are also coupled to one another to pass operand inputs and execution results between one another such that non-pipelined instructions issued to the sequencers 226A, 226B will use operand inputs from the appropriate register file 220A, 220B and write back results to the appropriate register file. FIG. 7, in particular, illustrates bypass multiplexers 232A, 232B, which are used to bypass the register file 220A, 220B when outputting results from the associated sequencer 226A, 226B. Multiplexers 234A, 234B are used to route operand inputs from either register file 220A, 220B to each sequencer 226A, 226B. Multiplexers 236A, 236B are used to write back results from each sequencer 226A, 226B to the appropriate register file 220A, 220B.

Controllers 228A, 228B control multiplexers 230A, 230B to 236A, 236B to cause non-pipelined instructions to be issued to either of sequencers 226A, 226B. As illustrated in routine 250 of FIG. 8, for example, whenever a core, and in particular, a floating point execution unit therein, receives a new instruction, a determination is made in block 252 as to whether the instruction is a supported non-pipelined instruction, i.e., a non-pipelined instruction capable of being executed by sequencer 226A, 226B. If not, control passes to block 254 to issue the instruction to the local execution pipeline, in a manner generally understood in the art.

If the instruction is a supported non-pipelined instruction, however, control passes to block 256 to determine whether the core's non-pipelined execution sequencer is busy, i.e., currently executing another non-pipelined instruction. If not, control passes to block 258 to issue the instruction to the core's non-pipelined execution sequencer, in a manner generally understood in the art.

Otherwise, if the core's non-pipelined execution sequencer is busy, block 256 passes control to block 260 to determine whether the paired core's non-pipelined execution sequencer is busy. If busy, block 260 returns control to block 256 to wait until one of the non-pipelined execution sequencers is idle, or no longer busy. Otherwise, if the non-pipelined execution sequencer in the paired core is idle, block 260 passes control to block 262 to issue the instruction to the paired core's non-pipelined execution sequencer.

As such, and with additional reference to FIG. 6, from the perspective of floating point execution unit 208A, instructions received by the floating point execution unit will either be issued to execution pipeline 222A for instructions other than non-pipelined instructions, issued to non-pipelined execution sequencer 226A for any non-pipelined instructions so long as sequencer 226A is not busy, or issued to non-pipelined execution sequencer 226B in floating point execution unit 208B if sequencer 226A is busy but sequencer 226B is idle. Likewise, from the perspective of floating point execution unit 208B, instructions received by the floating point execution unit will either be issued to execution pipeline 222B for instructions other than non-pipelined instructions, issued to non-pipelined execution sequencer 226B for any non-pipelined instructions so long as sequencer 226B is not busy, or issued to non-pipelined execution sequencer 226A in floating point execution unit 208A if sequencer 226B is busy but sequencer 226A is idle.

Furthermore, with reference to FIG. 7, for any non-pipelined instruction executed by either sequencer 226A, 226B, the operands for the instruction are retrieved from the appropriate register file 220A, 220B and results are subsequently written back to the appropriate register file 220A, 220B.

Therefore, whenever a core's local non-pipelined execution sequencer is busy, a non-pipelined instruction may be routed instead to another core's non-pipelined execution sequencer, thereby providing concurrent issue, and in many instances, concurrent execution of multiple non-pipelined instructions in an instruction stream. As such, the performance benefits of intermittent concurrent multi-instruction issuance of non-pipelined operations typically may be obtained in the illustrated embodiments without the circuit area cost of including multiple non-pipelined execution sequencers in each execution unit.

Various additional modifications may be made to the disclosed embodiments without departing from the spirit and scope of the invention. Therefore, the invention lies in the claims hereinafter appended.

What is claimed is:

1. A circuit arrangement, comprising:
    a first processing core disposed on an integrated circuit device and including a first execution unit that includes a first non-pipelined execution logic circuit, the first non-pipelined execution logic circuit configured to execute at least one non-pipelined instruction;
    a second processing core disposed on the integrated circuit device and including a second execution unit that includes a second non-pipelined execution logic circuit, the second non-pipelined execution logic circuit configured to execute the at least one non-pipelined instruction; and
    a multiplexing logic circuit coupling together the first and second execution units to receive a plurality of non-pipelined instructions issued to each of the first and second execution units and route the plurality of non-pipelined instructions to the first non-pipelined execution logic circuit for execution thereby, wherein the second processing core is configured to selectively issue a first non-pipelined instruction to the first non-pipelined execution logic circuit using the multiplexing logic circuit and to selectively issue a second non-pipelined instruction to the second non-pipelined execution logic circuit.

2. The circuit arrangement of claim 1, wherein the second processing core is configured to perform concurrent multiple instruction issue of the first and second non-pipelined instructions by selectively issuing the first and second non-pipelined instructions to the first and second non-pipelined execution logic circuits, respectively.

3. The circuit arrangement of claim 1, wherein the second processing core is configured to issue the first non-pipelined instruction to the first non-pipelined execution logic circuit only if the second non-pipelined execution logic circuit is busy executing another non-pipelined instruction.

4. The circuit arrangement of claim 1, wherein the second processing core is configured to issue the first non-pipelined instruction to the first non-pipelined execution logic circuit only if the first non-pipelined execution logic circuit is idle.

5. The circuit arrangement of claim 1, wherein the first and second non-pipelined execution logic circuits respectively include first and second non-pipelined execution sequencers.

6. The circuit arrangement of claim 5, wherein the first and second non-pipelined execution sequencers are respectively disposed in the first and second execution units, wherein the multiplexing logic circuit includes first and second multiplexers respectively disposed in the first and second execution units and respectively coupled to the first and second non-pipelined execution sequencers, and wherein the first and second multiplexers are respectively configured to forward non-pipelined instructions from both of the first and second processing cores to the first and second non-pipelined execution sequencers.

7. The circuit arrangement of claim 1, wherein the first and second non-pipelined execution logic circuits are configured to execute the same non-pipelined instructions.

8. The circuit arrangement of claim 1, further comprising a processing unit, wherein the first and second processing cores are adjacent to one another in the processing unit.

9. The circuit arrangement of claim 1, wherein the first processing core is configured to selectively issue a third non-pipelined instruction to the first non-pipelined execution logic circuit and to selectively issue a fourth non-pipelined instruction to the second non-pipelined execution logic circuit using the multiplexing logic circuit.

10. The circuit arrangement of claim 1, wherein the at least one non-pipelined instruction is selected from the group consisting of a multiply instruction, divide instruction, and a square root instruction.

11. The circuit arrangement of claim 1, wherein the first execution unit includes a first register file, wherein the second execution unit includes a second register file, and wherein the multiplexing logic circuit is further coupled to each of the first and second register files and configured to route at least one operand input from the second register file to the first non-pipelined execution logic circuit for use when executing the first non-pipelined instruction and route an execution result of the first non-pipelined instruction from the first non-pipelined execution logic circuit to the second register file.

12. A method of executing instructions in a processing unit of a type including first and second processing cores disposed on an integrated circuit device, wherein the first processing core includes a first execution unit that includes a first non-pipelined execution logic circuit, the first non-pipelined execution logic circuit configured to execute at least one non-pipelined instruction, and wherein the second processing core includes a second execution unit that includes a second non-pipelined execution logic circuit, the second non-pipelined execution logic circuit configured to execute the at least one non-pipelined instruction, the method comprising:

in the second processing core, issuing a first non-pipelined instruction to the first non-pipelined execution logic circuit in the first processing core using a multiplexing logic circuit coupling together the first and second execution units and configured to receive a plurality of non-pipelined instructions issued to each of the first and second execution units and route the plurality of non-pipelined instructions to the first non-pipelined execution logic circuit for execution thereby; and in the second processing core, issuing a second non-pipelined instruction to the second non-pipelined execution logic circuit in the second processing core.

13. The method of claim 12, wherein the second processing core is configured to perform concurrent multiple instruction issue of the first and second non-pipelined instructions by selectively issuing the first and second non-pipelined instructions to the first and second non-pipelined execution logic circuits, respectively.

14. The method of claim 12, wherein issuing the first non-pipelined instruction to the first non-pipelined execution logic circuit is performed only if the second non-pipelined execution logic circuit is busy executing another non-pipelined instruction.

15. The method of claim 12, wherein issuing the first non-pipelined instruction to the first non-pipelined execution logic circuit is performed only if the first non-pipelined execution logic circuit is idle.

16. The method of claim 12, wherein the first and second non-pipelined execution logic circuits respectively include first and second non-pipelined execution sequencers.

17. The method of claim 16, wherein the first and second non-pipelined execution sequencers are respectively disposed in the first and second execution units, wherein the method further comprises controlling first and second multiplexers of the multiplexing logic circuit respectively disposed in the first and second execution units and respectively coupled to the first and second non-pipelined execution sequencers to forward non-pipelined instructions from both of the first and second processing cores to the first and second non-pipelined execution sequencers.

18. The method of claim 12, wherein the first and second non-pipelined execution logic circuits are configured to execute the same non-pipelined instructions.

19. The method of claim 12, wherein the first and second processing cores are adjacent to one another in the processing unit.

20. The method of claim 12, further comprising:

in the first processing core, issuing a third non-pipelined instruction to the first non-pipelined execution logic circuit in the first processing core; and in the first processing core, issuing a fourth non-pipelined instruction to the second non-pipelined execution logic circuit in the second processing core using the multiplexing logic circuit.

21. The method of claim 12, wherein the at least one non-pipelined instruction is selected from the group consisting of a multiply instruction, divide instruction, and a square root instruction.

22. The method of claim 12, wherein the first execution unit includes a first register file, wherein the second execution unit includes a second register file, and wherein the multiplexing logic circuit is further coupled to each of the first and second register files, the method further comprising:

with the multiplexing logic circuit, routing at least one operand input from the second register file to the first non-pipelined execution logic circuit;

executing the first non-pipelined instruction with the first non-pipelined execution logic circuit using the at least one operand input; and with the multiplexing logic circuit, routing an execution result of the first non-pipelined instruction from the first non-pipelined execution logic circuit to the second register file.

\* \* \* \* \*